(12) United States Patent
Zhao et al.

(10) Patent No.: US 11,356,045 B2
(45) Date of Patent: Jun. 7, 2022

(54) DOUBLE VIRTUAL VOLTAGE VECTORS PREDICTIVE TORQUE CONTROL METHOD WITHOUT WEIGHTING FACTOR FOR FIVE-PHASE PERMANENT MAGNET SYNCHRONOUS MOTOR

(71) Applicant: JIANGSU UNIVERSITY, Zhenjiang (CN)

(72) Inventors: Wenxiang Zhao, Zhenjiang (CN); Huanan Wang, Zhenjiang (CN); Tao Tao, Zhenjiang (CN); Dezhi Xu, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/417,503

(22) PCT Filed: Apr. 28, 2020

(86) PCT No.: PCT/CN2020/087572
§ 371 (c)(1),
(2) Date: Jun. 23, 2021

(87) PCT Pub. No.: WO2021/203495
PCT Pub. Date: Oct. 14, 2021

(65) Prior Publication Data
US 2021/0399664 A1     Dec. 23, 2021

(30) Foreign Application Priority Data

Apr. 10, 2020    (CN) .................. 202010279675.X

(51) Int. Cl.
*H02P 21/20*       (2016.01)
*H02P 21/14*       (2016.01)
(Continued)

(52) U.S. Cl.
CPC ............ *H02P 21/20* (2016.02); *H02P 21/141* (2013.01); *H02P 21/30* (2016.02); *H02P 25/22* (2013.01); *H02P 27/12* (2013.01)

(58) Field of Classification Search
CPC ........ H02P 21/20; H02P 21/30; H02P 21/141; H02P 25/22; H02P 27/12
See application file for complete search history.

(56) References Cited

U.S. PATENT DOCUMENTS

| 2006/0132074 A1* | 6/2006 | Yang ..................... H02P 25/024 318/437 |
| 2007/0069681 A1* | 3/2007 | Imura ..................... H02P 6/182 318/717 |
| 2008/0129243 A1* | 6/2008 | Nashiki .................... H02K 3/28 318/701 |

FOREIGN PATENT DOCUMENTS

| CN | 105356810 A | 2/2016 |
| CN | 105790664 A | 7/2016 |

(Continued)

*Primary Examiner* — Eduardo Colon Santana
*Assistant Examiner* — Bradley R Brown
(74) *Attorney, Agent, or Firm* — Bayramoglu Law Offices LLC

(57) ABSTRACT

A double virtual voltage vectors predictive torque control method without weighting factor for five-phase permanent magnet synchronous motor includes: obtaining the current component in the two-phase stationary coordinate system and the outputting voltage at k interval; one step delay compensation is performed to obtain the current component in the two-phase stationary coordinate system at k+1 interval; predicting the flux and torque of motor at k+1 interval; calculating the reference voltage vector needed by the motor at k+1 interval according to the deadbeat principle and selecting the first virtual voltage vector; selecting the second virtual voltage vector according to the voltage error tracking principle and calculating the duration of the first virtual (Continued)

voltage vector and the second virtual voltage vector respectively and then synthesizing the two vectors and outputting.

6 Claims, 9 Drawing Sheets

(51) Int. Cl.
    *H02P 21/30*     (2016.01)
    *H02P 25/22*     (2006.01)
    *H02P 27/12*     (2006.01)

(56) References Cited

FOREIGN PATENT DOCUMENTS

| | | | | |
|---|---|---|---|---|
| CN | 106505927 A | * | 3/2017 | .............. H02P 21/22 |
| CN | 106505927 A | | 3/2017 | |
| CN | 106788073 A | | 5/2017 | |
| CN | 106803731 A | | 6/2017 | |
| CN | 108667389 A | | 10/2018 | |
| CN | 109039189 A | | 12/2018 | |
| CN | 109617481 A | | 4/2019 | |
| JP | 2013062900 A | | 4/2013 | |

\* cited by examiner

DOUBLE VIRTUAL VOLTAGE VECTORS PREDICTIVE TORQUE CONTROL METHOD WITHOUT WEIGHTING FACTOR FOR FIVE-PHASE PERMANENT MAGNET SYNCHRONOUS MOTOR

CROSS REFERENCE TO THE RELATED APPLICATIONS

This application is the national phase entry of International Application No. PCT/CN2020/087572, filed on Apr. 28, 2020, which is based upon and claims priority to Chinese Patent Application No. 202010279675.X, filed on Apr. 10, 2020, the entire contents of which are incorporated herein by reference.

TECHNICAL FIELD

The present invention belongs to the field of motor control technology, specifically relates to a predictive torque control method for five-phase permanent magnet synchronous motor.

BACKGROUND

A permanent magnet synchronous motor has the advantages of high efficiency, high power density, wide speed range, low torque ripple, strong fault-tolerant ability, etc. At the same time, the control method for five-phase motor also received widely concern, vector control and direct torque control are two most common control methods. However, vector control has complex coordinate and relatively slow dynamic response speed, the static performance of direct torque control is poor. Therefore, the research on model predictive torque control with simple control structure and fast dynamic response has practical significance.

Domestic and foreign scholars have made some achievements on the research of model predictive torque control method for permanent magnet synchronous motors. The Chinese invention patent "improved model predictive direct torque control method for permanent magnet synchronous generator" (patent No. CN201510701068.7) has disclosed a model predictive control method, however, due to the vector screening process of the method, it has the problem of heavy computation burden. The Chinese invention patent "model predictive control method for permanent magnet synchronous motor" (Patent No. CN201610197283.2) has disclosed a model predictive torque control method of reducing computation burden, but because the weighting factor still exists in the cost function, there is the problem that the weighting factor is difficult to debug. The Chinese invention patent "a predictive torque control method for permanent magnet synchronous motor" (Patent No. CN201811592637.9) has disclosed a model predictive control method of using error ranking to eliminate weight factor, however, due to the need to calculate multiple errors, the method still has the problem of heavy computation burden. The Chinese invention patent "a model predictive torque control method for five phase permanent magnet synchronous motor" (Patent No. CN201710022345.0) has disclosed a model predictive control method of reducing the set of candidate vectors, which reduces the computational burden, but because the method has no means to suppress torque and flux ripples, it has the problem of poor static performance. Therefore, most of the existing model predictive torque control methods have a large computation burden, and there are weight factors in the cost function, and the static performance is poor.

SUMMARY

The objective of the invention: in allusion to the problems existing in the existing technology, proposes a double virtual voltage vectors predictive torque control method without weighting factor for five phase permanent magnet synchronous motor, which uses virtual voltage vector to suppress harmonics and adopts deadbeat principle to obtain the optimal virtual voltage vector directly and quickly, it reduces the computation burden and does not need weighting factor. The voltage error tracking method is used to select the second vector to improve the static performance of the system.

Technical scheme: in order to realize the objective of the above invention, the technical scheme adopted by the present invention is as follows:

A double virtual voltage vectors predictive torque control method without weighting factor for five-phase permanent magnet synchronous motor includes the following steps:

Step 1: obtaining the current component $i_d^k$ and $i_q^k$ in the two-phase stationary coordinate system at k interval and the outputting voltage component $u_d^k$ and $u_q^k$ at k interval;

Step 2: one step delay compensation is performed for Step 1 to obtain the current component in the two-phase stationary coordinate system at k+1 interval;

Step 3: predicting the flux and torque of motor at k+1 interval according to the current component $i_d^{k+1}$ and $i_q^{k+1}$ in the two-phase stationary coordinate system at k+1 interval;

Step 4: calculating the reference voltage vector needed by the motor according to the deadbeat principle and selecting the first virtual voltage vector;

Step 5: selecting the second virtual voltage vector according to the voltage error tracking principle;

Step 6: calculating the duration of the first virtual voltage vector and the second virtual voltage vector respectively, then synthesizing the two vectors and outputting.

Further, the specific steps of Step 1 include: detecting the current $i_{abcde}$ in five-phase natural coordinate system in real time, and then obtaining the current component $i_d^k$ and $i_q^k$ in two-phase rotating coordinate system at k interval according to the coordinate transformation from five-phase natural coordinate system to two-phase rotating coordinate system; At the same time, detecting the pulse at k interval of the inverter to calculate the outputting voltage $u_s^k$ at k interval, and obtaining the voltage component in two-phase rotating coordinate system $u_d^k$ and $u_q^k$ according to the coordinate transformation.

Further, the specific steps of Step 2 include: Utilizing Euler forward discretization method to discrete the system equation of the motor to obtain:

$$\begin{cases} i_d^{k+1} = \left(1 - \frac{R_s T_s}{L_d}\right) i_d^k + L_q T_s \omega i_q^k + \frac{T_s u_d^k}{L_q} \\ i_q^{k+1} = -T_s \omega i_d^k + \left(1 - \frac{R_s T_s}{L_q}\right) i_q^k + \frac{T_s u_q^k}{L_q} - \frac{T_s \omega \psi_f}{L_q} \end{cases}$$

Wherein $i_d^k$ and $i_q^k$ are the currents in the two-phase stationary coordinate system at k interval. $i_d^{k+1}$ and $i_q^{k+1}$ are the currents in the two-phase stationary coordinate system at k+1 interval. $u_d^k$ and $u_q^k$ are the voltage in the two-phase stationary coordinate system at k interval. $T_s$ is the control period. $\omega$ is the electric angular velocity of rotor. $R_s$ is the stator resistance. $L_q$ and $L_d$ are the quadrature and digital axis inductance. $\psi_f$ is the flux linkage of permanent magnet;

Substituting $i_d^k$, $i_q^k$, $u_d^k$ and $u_q^k$ obtained in Step 1 into the above formula, the current $i_d^{k+1}$ and $i_q^{k+1}$ in the two-phase rotating coordinate system at k+1 interval can be obtained, the one step delay compensation is completed.

Further, the specific steps of Step 3 include: Substituting $i_d^{k+1}$ and $i_q^{k+1}$ into the following formula:

$$\begin{cases} T_e^{k+1} = 2.5 P_n i_q^{k+1} \psi_f \\ \psi_d^{k+1} = L_d i_d^{k+1} + \psi_f \\ \psi_q^{k+1} = L_q i_q^{k+1} \end{cases}$$

Wherein $i_d^{k+1}$ and $i_q^{k+1}$ are the currents in the two-phase stationary coordinate system at k+1 interval. $L_q$ and $L_d$ are the quadrature and digital axis inductance. $\psi_f$ is the flux linkage of permanent magnet; $P_n$ is the pole pairs of motor;

The quadrature and digital flux linkage $\psi_d^{k+1}$ and $\psi_q^{k+1}$ at k+1 interval and electromagnetic torque $T_e^{k+1}$ at k+1 interval can be predicted.

Further, the specific steps of Step 4 include:

4.1: Predicting the reference voltage vector needed by motor at k+1 interval;

Utilizing the Euler forward discretizing method to discretize the system equation to obtain the quadrature and digital axis flux linkage and $\psi_d^{k+2}$ and $\psi_q^{k+2}$ at k+2 interval:

$$\begin{cases} \psi_d^{k+2} = \psi_d^{k+1} + u_d^{k+1} T_s + \omega T_s \psi_q^{k+1} - \frac{R_s T_s}{L_d}(\psi_d^{k+1} - \psi_f) \\ \psi_q^{k+2} = \psi_q^{k+1} + u_q^{k+1} T_s - \omega T_s \psi_d^{k+1} - \frac{R_s T_s}{L_q} \psi_q^{k+1} \end{cases}$$

Wherein $u_d^{k+1}$ and $u_q^{k+1}$ are the voltage in the two-phase stationary coordinate system at k+1 interval $\psi_d^{k+1}$ and $\psi_q^{k+1}$ and are the quadrature and digital flux linkage at k+1 interval; $T_s$ is the control period; $\omega$ is the electric angular velocity of rotor; $R_s$ is the stator resistance; $L_q$ and $L_d$ are the quadrature and digital axis inductance; $\psi_f$ is the flux linkage of permanent magnet;

The expression of electromagnetic torque is:

$$T_e = \frac{5}{2} p_n \psi_f \frac{\psi_q}{L_q}$$

Wherein $T_e$ is the electromagnetic torque; $\psi_q$ is the quadrature axis flux linkage; $P_n$ is the pole pairs of motor.

Then, the time derivative of the two sides of the electromagnetic torque expression can be written as:

$$T_e^{k+2} - T_e^{k+1} = \frac{5}{2} p_n \psi_f \frac{(\psi_q^{k+2} - \psi_q^{k+1})}{L_q}$$

Wherein $T_e^{k+1}$ is the electromagnetic torque at k+1 interval; $T_e^{k+2}$ is the electromagnetic torque at k+2 interval; $\psi_q^{k+2}$ is the quadrature axis flux linkage.

Substituting the expression of $\psi_d^{k+2}$ into the above formula, it can be obtained:

$$T_e^{k+2} - T_e^{k+1} = \frac{5}{2} \frac{p_n \psi_f}{L_q}\left(u_q^{k+1} T_s - \omega T_s \psi_d^{k+1} - \frac{R_s T_s}{L_q} \psi_q^{k+1}\right)$$

The expression of $u_q^{k+1}$ can be obtained by phase shifting the above formula:

$$\left\{ u_q^{k+1} = \frac{2 L_d (T_e^{k+2} - T_e^{k+1})}{5 P_n \psi_f T_s} + \omega \psi_d^{k+1} + \frac{R_s \psi_q^{k+1}}{L_d} \right.$$

Because the voltage drop of the resistance is far less than the stator voltage, the resistance term in the expression of $\psi_q^{k+2}$ and $\psi_d^{k+2}$ can be ignored, so the formula is as follows:

$$(\psi^{k+2})^2 = (\psi_d^{k+2})^2 + (\psi_q^{k+2})^2$$
$$= (\psi_d^{k+1} + u_d^{k+1} T_s + \omega T_s \psi_q^{k+1})^2 + (\psi_q^{k+1} + u_q^{k+1} T_s - \omega T_s \psi_d^{k+1})^2$$

Substituting the expression of $u_q^{k+1}$ into the above expression can obtain the expression of $u_d^{k+1}$;

$$u_d^{k+1} = \frac{\sqrt{(\psi^{k+2})^2 - (u_q^{k+1} T_s + \psi_q^{k+1} - \omega T_s \psi_d^{k+1})^2}}{T_s} - \omega \psi_q^{k+1} - \frac{\psi_d^{k+1}}{T_s}$$

According to the deadbeat principle of torque and flux, the torque and flux at k+2 interval are expected to reach the given value, so there is:

$$\begin{cases} T_e^{k+2} = T_e^* \\ \psi^{k+2} = \psi_f \end{cases}$$

Wherein $T_e^*$ is the given electromagnetic torque; therefore, the expression of the expected reference voltage is:

$$\begin{cases} u_q^{k+1} = \frac{2 L_d (T_e^* - T_e^{k+1})}{5 P_n \psi_f T_s} + \omega \psi_d^{k+1} + \frac{R_s \psi_q^{k+1}}{L_d} \\ u_d^{k+1} = \frac{\sqrt{(\psi_f)^2 - (u_q^{k+1} T_s + \psi_q^{k+1} - \omega T_s \psi_d^{k+1})^2}}{T_s} - \omega \psi_q^{k+1} - \frac{\psi_d^{k+1}}{T_s} \end{cases}$$

After the coordinate transformation, the component in two-phase stationary coordinate system of the reference voltage can be obtained:

$$u_{ref} = \begin{pmatrix} u_\alpha^{k+1} \\ u_\beta^{k+1} \end{pmatrix} = \begin{pmatrix} \cos\theta & -\sin\theta \\ \sin\theta & \cos\theta \end{pmatrix} \begin{pmatrix} u_d^{k+1} \\ u_q^{k+1} \end{pmatrix}$$

Wherein $\theta$ is the rotor position angle; $u_{ref}$ is the expected reference voltage.

4.2: Synthesis of the virtual voltage vector;

The five phase voltage source inverter provides 32 kinds of switch combinations, and each switch combination corresponds to a space voltage vector. Therefore, the five phase voltage source inverter can output 32 space voltage vectors $U_0$-$U_{31}$, including 30 active vectors $U_1$-$U_{30}$ and 2 zero vectors $U_0$, $U_{31}$; The active vectors can be divided into three categories according to their amplitudes: large vector, medium vector and small vector; in the α-β plane, the vector distribution is as follows:

Large vectors are: $U_3$, $U_6$, $U_7$, $U_{12}$, $U_{14}$, $U_{17}$, $U_{19}$, $U_{24}$, $U_{25}$, $U_{28}$;

Medium vectors are: $U_1$, $U_2$, $U_4$, $U_8$, $U_{15}$, $U_{16}$, $U_{23}$, $U_{27}$, $U_{29}$, $U_{30}$;

Small vectors are: $U_5$, $U_9$, $U_{10}$, $U_{11}$, $U_{13}$, $U_{18}$, $U_{20}$, $U_{21}$, $U_{22}$, $U_{26}$;

in the x-y plane, the vector distribution is as follows:

large vectors are: $U_5$, $U_9 U_{10}$, $U_{11}$, $U_{13}$, $U_{18}$, $U_{20}$, $U_{21}$, $U_{22}$, $U_{26}$;

medium vectors are: $U_1$, $U_2$, $U_4$, $U_8$, $U_{15}$, $U_{16}$, $U_{23}$, $U_{27}$, $U_{29}$, $U_{30}$;

small vectors are: $U_3$, $U_6$, $U_7$, $U_{12}$, $U_{14}$, $U_{17}$, $U_{19}$, $U_{24}$, $U_{25}$, $U_{28}$;

In the α-β plane, the large and medium vectors in the same direction are projected onto the x-y plane, which are small and medium vectors in the opposite direction, Therefore, the harmonic voltage in the x-y plane can be completely eliminated by synthesizing the large and medium vectors in the same direction in a certain proportion, the following formula can be used to synthesize the virtual voltage vector:

$$VVV_i(u_M, u_L) = 0.382 \times u_M + 0.618 \times u_L$$

Wherein $u_M$ is the medium vector, $u_L$ is the large vector, $VVV_i$ is the virtual voltage vector;

The synthesized virtual voltage vectors are 10: $VVV_{1\sim10}$, their amplitude is 0.5527 $U_{dc}$, $U_{dc}$ is DC bus voltage;

4.3: Selecting the first virtual voltage vector;

According to the expression of reference voltage vector $U_{ref}$ in two-phase stationary coordinate system, the sector where $U_{ref}$ is located in can be judged. Assuming $U_{ref}$ is located in the first sector, $D_1$, $D_2$ and $D_{10}$ represent the error between $U_{ref}$ and $VVV_1$, $VVV_2$ and $VVV_{10}$ respectively, obviously, $D_1$ is smaller than $D_2$ and $D_{10}$, therefore, $VVV_1$ can be selected as the first vector, and in the same way when $U_{ref}$ is located in other sectors.

Further, the specific steps of Step 5 include:

5.1: Selection of the second vector;

Point O is the origin of coordinates, point A is the end point of $VVV_1$, point C is the end point of angular bisector of ∠OAD, point D is the intersection of the division line of the first sector and the sector boundary, point F is the end point of reference voltage vector $U_{ref}$, and points M and N are the closest points from the two edges of ∠OAD to point F respectively;

Assuming $U_{ref}$ is located in the first sector, AC is the angular bisector of ∠OAD, and the distance from any point on the angular bisector to both sides of the angle is equal; therefore, AC is divided into two areas: Area ADO and area ACD;

When the end point F of $U_{ref}$ is located in the area ADO, FM must be smaller than FN and FA, which means that the error between $\overrightarrow{OM}$ and $U_{ref}$ is the smallest; therefore, zero vector is selected as the second vector to synthesize $\overrightarrow{OM}$ with the first virtual voltage vector $VVV_1$ and $\overrightarrow{OM}$ can be outputted;

When the end point F of $U_{ref}$ is located in ACD, FN must be less than FM and FA, which means that the error between $\overrightarrow{ON}$ and $U_{ref}$ is the smallest. Therefore, $VVV_2$ can be selected as the second vector to synthesize $\overrightarrow{ON}$ with the first virtual voltage vector $VVV_1$ and $\overrightarrow{ON}$ can be outputted;

In the same way, when $U_{ref}$ is located at the position of $U_{ref1}$, the second vector can be selected between zero vector and $VVV_{10}$, so the second vector can be zero vector or virtual voltage vector which is adjacent to the first virtual voltage vector;

5.2: Optimization of the cost function;

In order to avoid this complicated calculation, ∠FAO can be used as the cost function, ∠CAO is fixed, if ∠FAO is larger than ∠CAO and the terminal F is in the area ACD, then a virtual voltage vector which is adjacent to the first vector can be selected as the second vector; if ∠FAO is less than ∠CAO and the terminal F is in the area ADC, then the zero vector can be selected as the second vector; therefore, the vector can be selected by only comparing ∠FAO and ∠CAO. In this way, weighting factor is not required in the process of selecting two vectors.

Further, the specific steps of Step 6 include:

6.1: Vector duration calculation;

When a virtual voltage vector and a zero vector are selected, $\overrightarrow{ON}$ is the vector to be outputted, $\overrightarrow{ON}$ is the projection of $U_{ref}$ on the line where $VVV_1$ is located, and the amplitude of $VVV_1$ is 0.5527 $U_{dc}$; therefore, the following formula can be used to calculate the duration of $VVV_1$;

$$T_{opt} = \frac{|\overrightarrow{ON}|}{0.5527 U_{dc}} T_s = \frac{|U_{ref}|\cos(\delta)}{0.5527 U_{dc}} T_s$$

Wherein $T_{opt}$ represents the duration of $VVV_1$, then $(T_s - T_{opt})$ represents the duration of zero vector; $U_{dc}$ is the DC bus voltage; $T_s$ is the control period; $U_{ref}$ is the reference voltage vector; δ the angle between $U_{ref}$ and $VVV_1$;

When two adjacent virtual voltage vectors $VVV_1$ and $VVV_2$ are selected, the following formula can be used to synthesize $\overrightarrow{ON}$:

$$\begin{cases} \overrightarrow{ON} = \overrightarrow{OM} + \overrightarrow{MN} \\ \overrightarrow{OM} = VVV_1 \dfrac{T_{opt1}}{T_s} \\ \overrightarrow{MN} = VVV_2 \dfrac{T_{opt2}}{T_s} \end{cases}$$

Wherein $T_{opt1}$ represents the duration of $VVV_1$ and $T_{opt2}$ represents the duration of $VVV_2$; δ is the angle between $\overrightarrow{AF}$ and $\overrightarrow{AN}$;

There are the following geometric relations:

$$\begin{cases} |\overrightarrow{AN}| = |\overrightarrow{AF}|\cos(\delta) = |VVV_1 - U_{ref}|\cos(\delta) \\ |\overrightarrow{MN}| = 1.618|\overrightarrow{AN}| = |VVV_2|\dfrac{T_{opt2}}{T_s} \end{cases}$$

The duration of $VVV_1$ and $VVV_2$ can be obtained by shifting the phase slightly:

$$\begin{cases} T_{opt2} = \dfrac{1.618|\overrightarrow{U_{ref}} - VVV_1|\cos(\delta)}{0.5527 U_{dc}} T_s \\ T_{opt1} = T_s - T_{opt2} \end{cases}$$

6.2: PWM generation; The vectors selected in each sector are different, but the principle of arranging the switching sequence is the same, Assuming it is the first sector, if $VVV_1$ is selected as the first vector and zero vector is selected as the second vector, then the vector action sequence should be: $U_0(00000) \to U_{16}(10000) \to U_{25}(11001) \to U_{25}(11001) \to U_{16}(10000) \to U_0(00000)$; If $VVV_1$ is selected as the first vector and $VVV_2$ is selected as the second vector, the sequence of vector action should be: $U_{16}(10000) \to U_{24}(11000) \to U_{25}(11001) \to U_{29}(11101) \to U_{29}(11101) \to U_{25}(11001) \to U_{24}(11000) \to U_{16}(10000)$.

The present invention has the beneficial effects of:

1) The present invention adopts the principle of torque and flux deadbeat to select vectors directly and quickly, it greatly reduces the calculation burden;

2.) In one control period, two virtual voltage vectors are selected to synthesize and output, which reduces the error between the synthesized vector and the required reference voltage vector, and effectively improves the static performance of the motor;

3) The second vector is selected according to the principle of voltage error tracking, and the cost function is the error between vectors, thus avoiding the process of twining weight factor;

4) The proposed control method has the simple structure and is easy to implement, which is beneficial for the engineering and practical application of the new theory.

BRIEF DESCRIPTION OF THE DRAWINGS

FIG. 5A and FIG. 5B are the schematic diagrams of principle of the second virtual voltage vector selection; in which FIG. 5A is a schematic diagram of principle of selection of the zero vector; and FIG. 5B is a schematic diagram of principle of selection of the active vector;

FIG. 6A and FIG. 6B are the schematic diagrams of the principle of vector duration calculation; in which FIG. 6A is a schematic diagram of the principle of duration calculation of one virtual voltage vector and zero vector; FIG. 6B is a schematic diagram of the principle of duration calculation of two virtual voltage vectors;

FIG. 7A and FIG. 7B are the diagrams of action sequence of space voltage vectors; in which FIG. 7A is a diagram of action sequence of one virtual voltage vector and zero vector; FIG. 7B is a diagram of action sequence of two virtual voltage vectors;

FIG. 8A and FIG. 8B are the diagrams of static performance experiment; in which FIG. 8A is a diagram of a static performance experiment of the conventional model predictive control method; FIG. 8B is a diagram of a static performance experiment of the control method of this invention;

FIG. 9A and FIG. 9B are the diagrams of dynamic performance experiment; in which FIG. 9A is a diagram of a dynamic performance experiment of the conventional model predictive control method; FIG. 9B is a diagram of a dynamic performance experiment of the control method of this invention;

DETAILED DESCRIPTION OF THE EMBODIMENTS

Figure 1:
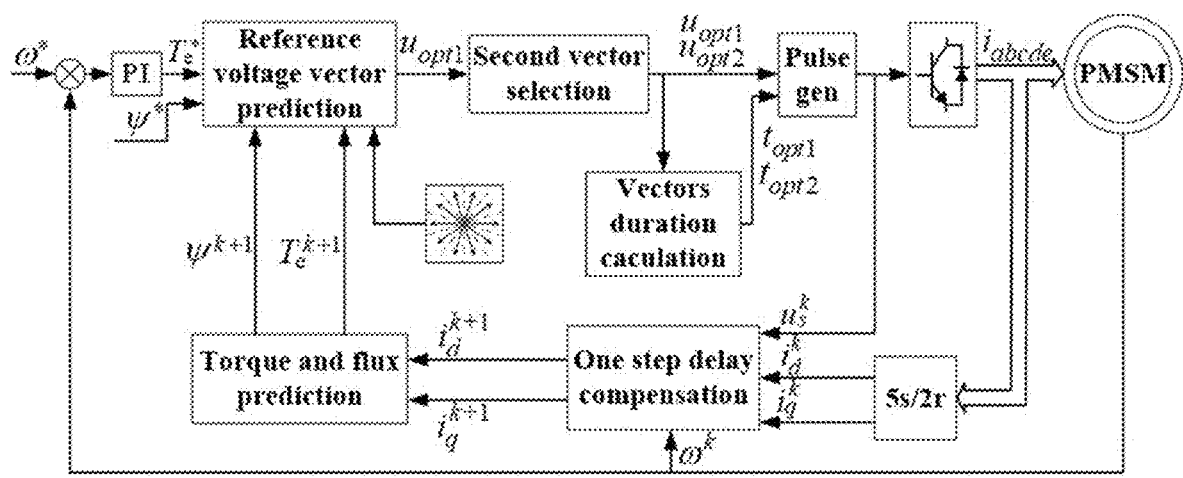
FIG. 1 is a schematic diagram of the control principle of the embodiment method of the present invention.

In order to make the objectives, technical solutions, and effects of the present invention clearer, the invention is farther described in detail below with reference to the accompanying drawings and specific embodiments.

The specific implementation steps of the proposed double virtual voltage vectors predictive torque control method without weighting factor for five-phase permanent magnet synchronous motor include:

Step 1: obtaining the current component in the two-phase stationary coordinate system and the outputting voltage at k interval;

1.1: Calculating the speed error between the given speed $\omega^*$ and the actual speed $\omega^k$ in real time, the required given torque $T^*_e$ can be obtained through PI regulator, and the given flux is the permanent magnet flux of the motor;

1.2: detecting the current $i_{abcde}$ in five-phase natural coordinate system, then the current components $i_d^k$ and $i_q^k$ in two-phase rotating coordinate system at k interval can be obtained according to the coordinate transformation from five-phase natural coordinate system to two-phase rotating coordinate system;

The transformation matrix from five-phase natural coordinate system ABCDE to two-phase rotating coordinate system is expressed as follows:

$$T_{5s/2r} = \frac{2}{5} \begin{bmatrix} \cos\theta_e & \cos(\theta_e - \alpha) & \cos(\theta_e - 2\alpha) & \cos(\theta_e - 3\alpha) & \cos(\theta_e - 4\alpha) \\ -\sin\theta_e & -\sin(\theta_e - \alpha) & -\sin(\theta_e - 2\alpha) & -\sin(\theta_e - 3\alpha) & -\sin(\theta_e - 4\alpha) \\ \cos 3\theta_e & \cos 3(\theta_e - \alpha) & \cos 3(\theta_e - 2\alpha) & \cos 3(\theta_e - 3\alpha) & \cos 3(\theta_e - 4\alpha) \\ -\sin 3\theta_e & -\sin 3(\theta_e - \alpha) & -\sin 3(\theta_e - 2\alpha) & -\sin 3(\theta_e - 3\alpha) & -\sin 3(\theta_e - 4\alpha) \\ \frac{1}{2} & \frac{1}{2} & \frac{1}{2} & \frac{1}{2} & \frac{1}{2} \end{bmatrix}$$

Wherein $\alpha = 0.4\pi$, $\theta_e$ is the electric angle of the motor.

1.3: At the same time, detecting the pulse of the inverter to calculate the output voltage $u_s^k$ in the two-phase stationary coordinate system, and the voltage components $u_d^k$ and $u_q^k$ in the two-phase rotating coordinate can be obtained by coordinate transformation.

The transformation matrix from two-phase rotating coordinate system to two-phase stationary coordinate system is expressed as follows:

$$T_{2r/2s} = \begin{bmatrix} \cos\theta_e & -\sin\theta_e & 0 & 0 & 0 \\ \sin\theta_e & \cos\theta_e & 0 & 0 & 0 \\ 0 & 0 & \cos3\theta_e & -\sin3\theta_e & 0 \\ 0 & 0 & \sin3\theta_e & \cos3\theta_e & 0 \\ 0 & 0 & 0 & 0 & 1 \end{bmatrix}$$

Wherein $\theta_e$ is the electric angle of the motor.

Step 2: The current component in the two-phase stationary coordinate system at k+1 interval can be obtained by the one step delay compensation.

2.1: Discretizing the system equation;

The system equation in two-phase rotating coordinate system is as follows:

$$\begin{cases} u_d = R_s i_d - \omega\psi_q + \dfrac{d\psi_d}{dt} \\ u_q = R_s i_q + \omega\psi_d + \dfrac{d\psi_q}{dt} \end{cases}$$

Wherein $i_d^k$ and $i_q^k$ are the currents in the two-phase stationary coordinate system; $u_d$ and $u_q$ are the voltage in the two-phase stationary coordinate system; $\omega$ is the electric angular velocity of rotor; $R_s$ is the stator resistance. $\psi_d$ and $\psi_q$ are the quadrature and digital flux linkage; $L_q$ and $L_d$ are the quadrature and digital axis inductance; t is the time;

The Euler forward discretization. method is utilized to discretize the above system equations, it can obtain:

$$\begin{cases} i_d^{k+1} = \left(1 - \dfrac{R_s T_s}{L_d}\right)i_d^k + L_q T_s \omega i_q^k + \dfrac{T_s u_d^k}{L_d} \\ i_q^{k+1} = -T_s \omega i_d^k + \left(1 - \dfrac{R_s T_s}{L_q}\right)i_q^k + \dfrac{T_s u_q^k}{L_q} - \dfrac{T_s \omega \psi_f}{L_q} \end{cases}$$

Wherein $i_d^k$ and $i_q^k$ are the currents in the two-phase stationary coordinate system at k interval. $i_d^{k+1}$ and $i_q^{k+1}$ are the currents in the two-phase stationary coordinate system at k+1 interval. $u_d^k$ and $u_q^k$ are the voltage in the two-phase stationary coordinate system at k interval. $T_s$ is the control period. $\omega$ is the electric angular velocity of rotor. $R_s$ is the stator resistance. $L_q$ and $L_d$ are the quadrature and digital axis inductance. $\psi_f$ the flux linkage of permanent magnet;

2.2: Delay compensation;

Substituting $i_d^k$, $i_q^k$, $u_d^k$ and $u_q^k$ which are obtained in Step 1 into the discrete system equations, the current and $i_d^{k+1}$ and $i_q^{k+1}$ in the two-phase rotating coordinate system at k+1 interval can be obtained, then the one step delay compensation is completed.

Step 3: Predicting the flux and torque of motor at k+1 interval according to the current component $i_d^{k+1}$ and $i_q^{k+1}$ in the two-phase stationary coordinate system at k+1 interval.

Substituting $i_d^{k+1}$ and $i_q^{k+1}$ into the following formula:

$$\begin{cases} T_e^{k+1} = 2.5 P_n i_q^{k+1} \psi_f \\ \psi_d^{k+1} = L_d i_d^{k+1} + \psi_f \\ \psi_q^{k+1} = L_q i_q^{k+1} \end{cases}$$

Wherein $i_d^{k+1}$ and $i_q^{k+1}$ are the currents in the two-phase stationary coordinate system at k+1 interval. $L_q$ and $L_d$ are the quadrature and digital axis inductance. $\psi_f$ is the flux linkage of permanent magnet; $P_n$ is the pole pairs of motor;

It can predict the quadrature and digital flux linkage $\psi_d^{k+1}$ and $\psi_q^{k+1}$ at k+1 interval and electromagnetic torque $T_e^{k+1}$ at k+1 interval.

Step 4: Calculating the reference voltage vector needed by the motor at k+1 interval according to the deadbeat principle and selecting the first virtual voltage vector.

4.1 Predicting the required reference voltage vector at k+1 interval;

Utilizing the Euler forward discretizing method to discretize the system equation to obtain the quadrature and digital axis flux linkage $\psi_d^{k+2}$ and $\psi_q^{k+2}$ at k+2 interval:

$$\begin{cases} \psi_d^{k+2} = \psi_d^{k+1} + u_d^{k+1} T_s + \omega T_s \psi_q^{k+1} - \dfrac{R_s T_s}{L_d}(\psi_d^{k+1} - \psi_f) \\ \psi_q^{k+2} = \psi_q^{k+1} + u_q^{k+1} T_s - \omega T_s \psi_d^{k+1} - \dfrac{R_s T_s}{L_q}\psi_q^{k+1} \end{cases}$$

Wherein $u_d^{k+1}$ and $u_q^{k+1}$ are the voltage in the two-phase stationary coordinate system at k+1 interval; $\psi_d^{k+1}$ and $\psi_q^{k+1}$ are the quadrature and digital flux linkage at k+1 interval; $T_s$ is the control period; $\omega$ is the electric angular velocity of rotor; $R_s$ is the stator resistance; $L_q$ and $L_d$ are the quadrature and digital axis inductance; $\psi_f$ is the flux linkage of permanent magnet;

The expression of electromagnetic torque is:

$$T_e = \frac{5}{2} p_n \psi_f \frac{\psi_q}{L_q}$$

Wherein $T_e$ is the electromagnetic torque; $\psi_q$ is the quadrature axis flux linkage; $\psi_f$ is the flux linkage of permanent magnet; $P_n$ is the pole pairs of motor.

Then, the time derivative of two sides of the electromagnetic torque expression can be written as follow:

$$T_e^{k+2} - T_e^{k+1} = \frac{5}{2} p_n \psi_f \frac{(\psi_q^{k+2} - \psi_q^{k+1})}{L_q}$$

Wherein $T_e^{k+1}$ is the electromagnetic torque at k+1 interval; $T_e^{k+2}$ is the electromagnetic torque at k+2 interval; $L_q$ is the quadrature axis inductance; $\psi_q^{k+1}$ is the quadrature axis flux linkage at k+1 interval; $\psi_q^{k+2}$ is the quadrature axis flux linkage at k+2 interval; $P_n$ is the pole pairs of motor;

Substituting the expression of $\psi_q^{k+2}$ into the above formula, it can obtain:

$$T_e^{k+2} - T_e^{k+1} = \frac{5}{2} \frac{p_n \psi_f}{L_q}\left(u_q^{k+1} T_s - \omega T_s \psi_d^{k+1} - \frac{R_s T_s}{L_q}\psi_q^{k+1}\right)$$

The expression of $u_q^{k+1}$ can be obtained by phase shifting the above formula:

$$\begin{cases} u_q^{k+1} = \dfrac{2L_d(T_e^{k+2} - T_e^{k+1})}{5 P_n \psi_f T_s} + \omega \psi_d^{k+1} + \dfrac{R_s \psi_q^{k+1}}{L_d} \end{cases}$$

Because the voltage drop of the resistance is far less than the stator voltage, the resistance term in the $\psi_q^{k+2}$ and $\psi_d^{k+2}$ expression can be ignored, so the formula is as follows:

$$(\psi^{k+2})^2 = (\psi_d^{k+2})^2 + (\psi_q^{k+2})^2$$

$$= (\psi_d^{k+1} + u_d^{k+1}T_s + \omega T_s \psi_q^{k+1})^2$$

$$+ (\psi_q^{k+1} + u_q^{k+1}T_s - \omega T_s \psi_d^{k+1})^2$$

Substituting the expression of $u_q^{k+1}$ into the above expression can obtain the expression of $u_d^{k+1}$.

$$u_d^{k+1} = \frac{\sqrt{(\psi^{k+2})^2 - (u_q^{k+1}T_s + \psi_q^{k+1} - \omega T_s \psi_d^{k+1})^2}}{T_s} - \omega \psi_q^{k+1} - \frac{\psi_d^{k+1}}{T_s}$$

According to the deadbeat principle of torque and flux, the torque and flux at k+2 interval are expected to reach the given value, so there is:

$$\begin{cases} T_e^{k+2} = T_e^* \\ \psi^{k+2} = \psi_f \end{cases}$$

Wherein $\psi^{k+2}$ is the flux linkage at k+2 interval. $\psi_f$ is the flux linkage of permanent magnet; $T_e^{k+2}$ is the electromagnetic torque at k+2 interval; $T^*_e$ is the given electromagnetic torque;

Therefore, the expression of the expected reference voltage is:

$$\begin{cases} u_q^{k+1} = \frac{2L_d(T_e^* - T_e^{k+1})}{5P_n \psi_f T_s} + \omega \psi_d^{k+1} + \frac{R_s \psi_q^{k+1}}{L_d} \\ u_d^{k+1} = \frac{\sqrt{(\psi_f)^2 - (u_q^{k+1}T_s + \psi_q^{k+1} - \omega T_s \psi_d^{k+1})^2}}{T_s} - \omega \psi_q^{k+1} - \frac{\psi_d^{k+1}}{T_s} \end{cases}$$

After the coordinate transformation, the reference voltage component in two-phase stationary coordinate system can be obtained:

$$u_{ref} = \begin{pmatrix} u_\alpha^{k+1} \\ u_\beta^{k+1} \end{pmatrix} = \begin{pmatrix} \cos\theta & -\sin\theta \\ \sin\theta & \cos\theta \end{pmatrix} \begin{pmatrix} u_d^{k+1} \\ u_q^{k+1} \end{pmatrix}$$

Wherein $\theta$ is the rotor position angle; $u_{ref}$ the expected reference voltage.

4.2.: Synthesis of virtual voltage vector;

The five phase voltage source inverter provides 32 kinds of switch combinations, and each switch combination corresponds to a space voltage vector. Therefore, the five phase voltage source inverter can output 32 space voltage vectors, including 30 active vectors and 2 zero vectors. The active vectors can be divided into three categories according to their amplitudes: large vector, medium vector and small vector, As shown in Table I, it is the vector distribution in the α-β plane, the vector distribution in the x-y plane is shown in Table II.

TABLE I

| Voltage vectors | Amplitude | Vectors |
| --- | --- | --- |
| Large vectors | 0.6472 $U_{dc}$ | $U_3 U_6 U_7 U_{12} U_{14} U_{17} U_{19} U_{24} U_{25} U_{28}$ |
| Medium vectors | 0.4 $U_{dc}$ | $U_1 U_2 U_4 U_8 U_{15} U_{16} U_{23} U_{27} U_{29} U_{30}$ |
| Small vectors | 0.2472 $U_{dc}$ | $U_5 U_9 U_{10} U_{11} U_{13} U_{18} U_{20} U_{21} U_{22} U_{26}$ |
| Zero vectors | 0 | $U_0 U_{31}$ |

TABLE II

| Voltage vectors | Amplitude | Vectors |
| --- | --- | --- |
| Larger vectors | 0.6472 $U_{dc}$ | $U_5U_9U_{10}U_{11}U_{13}U_{18}U_{20}U_{21}U_{22}U_{26}$ |
| Medium vectors | 0.4 $U_{dc}$ | $U_1U_2U_4U_8U_{15}U_{16}U_{23}U_{27}U_{29}U_{30}$ |
| Small vectors | 0.2472 $U_{dc}$ | $U_3U_6U_7U_{12}U_{14}U_{17}U_{19}U_{24}U_{25}U_{28}$ |
| Zero vectors | 0 | $U_0U_{31}$ |

Figure 2A:
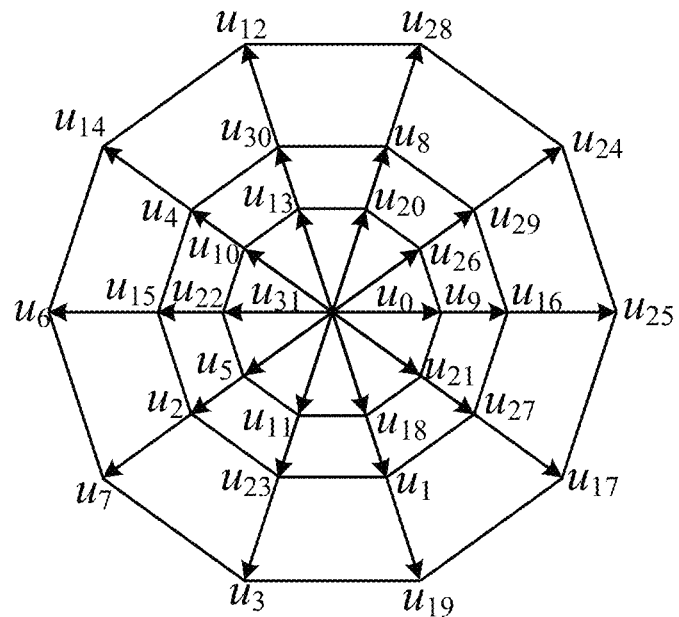
FIG. 2A is the diagram of distribution of space voltage vectors provided by five phase inverter; in the $\alpha$-$\beta$ plane.
Figure 2B:
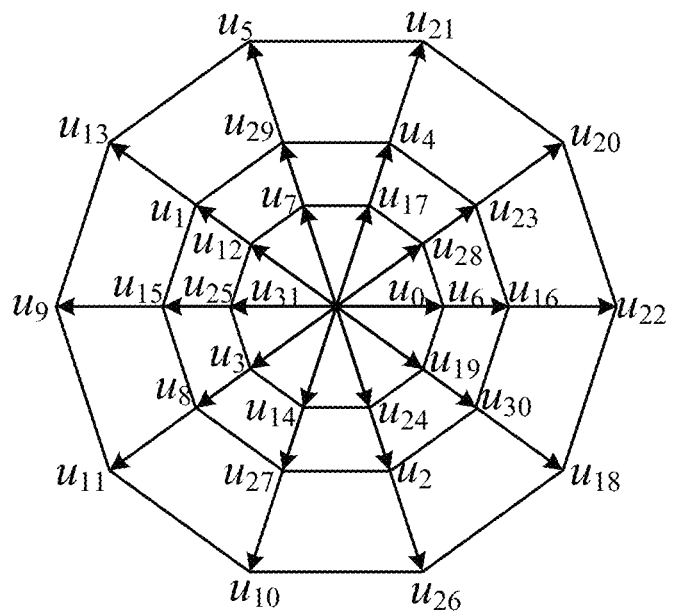
FIG. 2B is the diagram of distribution of space voltage vectors provided by five phase inverter in the x-y plane.
Figure 3:
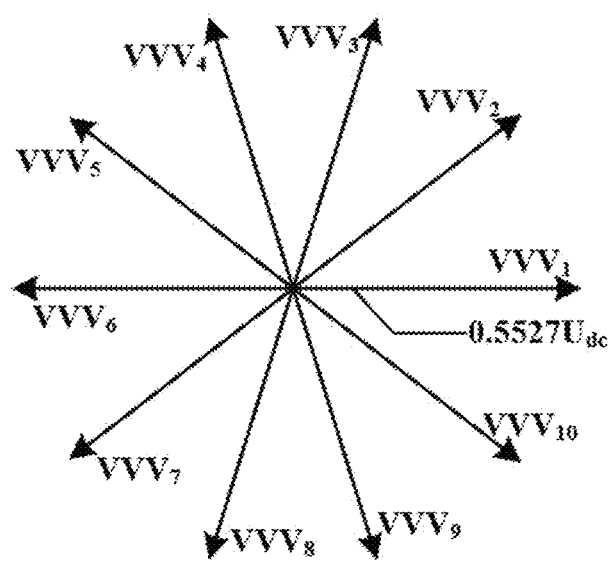
FIG. 3 is the diagram of distribution of virtual voltage vectors in $\alpha$-$\beta$ plane.
Figure 4:
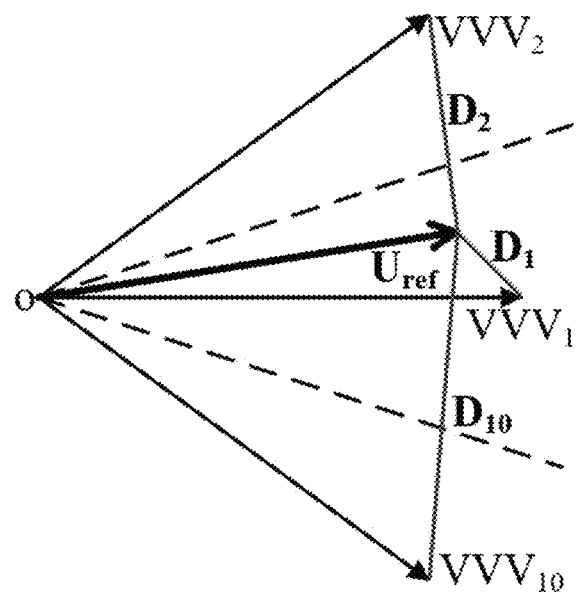
FIG. 4 is the schematic diagram of the principle of the first virtual voltage vector selection.

FIG. 2A and FIG. 2B show the distribution of space voltage vector in α-β plane and x-y plane of five phase motor. As shown in FIG. 2A and FIG. 2B, the large and medium vectors in the same direction in α-β plane are projected onto the x-y plane, which are small and medium vectors in the opposite direction. Therefore, the harmonic voltage in the x-y plane can be completely eliminated by synthesizing the large and medium vectors in the same direction in a certain proportion. The following formula can be used to synthesize the virtual voltage vector:

$$VVV_i(u_M, u_L) = 0.382 \times u_M + 0.618 \times u_L$$

Wherein $u_M$ is the medium vector, $u_L$ is the large vector, VVV is the virtual voltage vector;

As shown in FIG. 3, there are 10 synthesized virtual voltage vectors: $VVV_{1\sim10}$, their amplitude is 0.552 $U_{dc}$, $U_{dc}$ is DC bus voltage;

4.3: Selecting the first virtual voltage vector;

According to the expression of reference voltage vector $U_{ref}$ in two-phase stationary coordinate system, the sector where $U_{ref}$ is located in can be judged. As shown in FIG. 4, assuming $U_{ref}$ is located in the first sector, $D_1$, $D_2$ and $D_{10}$ represent the error between $U_{ref}$ and $VVV_1$, $VVV_2$ and $VVV_{10}$ respectively. Obviously, $D_1$ is smaller than $D_2$ and $D_{10}$. Therefore, $VVV_1$ can be selected as the first vector, and in the same way when $U_{ref}$ is located in other sectors.

Step 5: Selecting the second virtual voltage vector according to the principle of voltage error tracking.

Figure 5A:
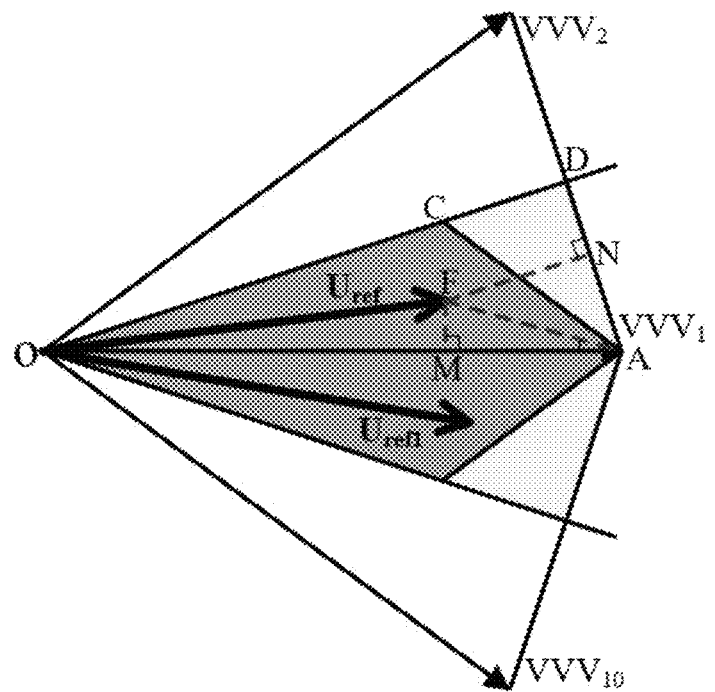
Figure 5B:
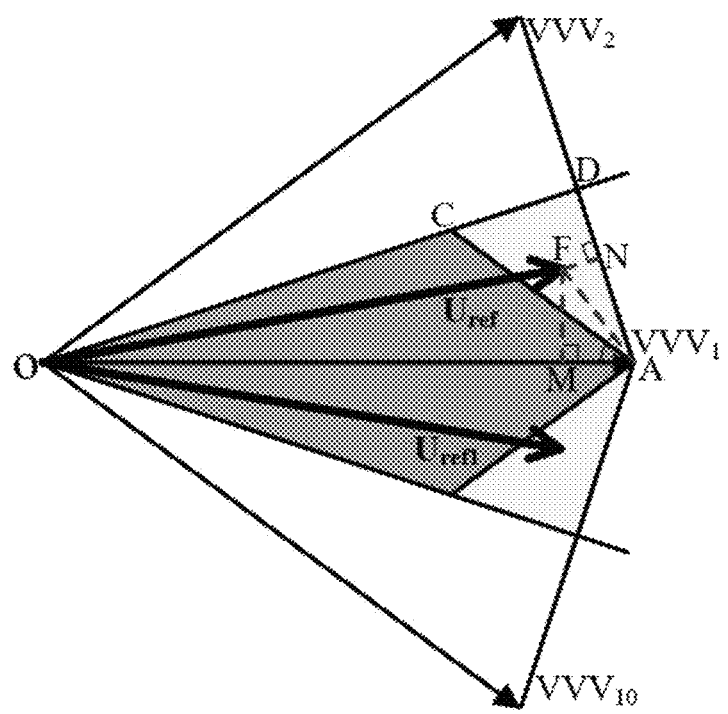

5.1: Selection of the second virtual voltage vector;

As shown in FIG. 5A and FIG. 5B, Point O is the origin of coordinates, point A is the end point of $VVV_1$, point C is the end point of angular bisector of ∠OAD, point D is the intersection of the division line of the first sector and the sector boundary, point F is the end point of reference voltage vector $U_{ref}$, and points M and N are the closest points from the two edges of ∠OAD to point F respectively;

Assuming $U_{ref}$ is located in the first sector, AC is the angular bisector of ∠OAD, and the distance from any point on the angular bisector to both sides of the angle is equal; therefore, AC is divided into two areas: area ADO and area ACD. As shown in FIG. 5A, when the end point F of $U_{ref}$ is located in the area ADO, FM must be smaller than FN and FA, which means that the error between $\overrightarrow{OM}$ and $U_{ref}$ is the smallest; therefore, zero vector is selected as the second vector to synthesize $\overrightarrow{OM}$ with the first virtual voltage vector $VVV_1$ and $\overrightarrow{OM}$ can be outputted. As shown in FIG. 5B, when the end point F of $U_{ref}$ is located in ACD, FN must be less than FM and FA, which means that the error between $\overrightarrow{ON}$ and $U_{ref}$ is the smallest. Therefore, $VVV_2$ can be selected as the second vector to synthesize $\overrightarrow{ON}$ with the first virtual voltage vector $VVV_1$ and $\overrightarrow{ON}$ can be outputted. In the same way, when $U_{ref}$ is located at the position of $U_{ref1}$, the second vector can be selected between zero vector and $VVV_{10}$, so the second vector can be zero vector or virtual voltage vector adjacent to the first virtual voltage vector.

5.2: Optimization of cost function;

The calculation of errors between vectors is very complicated, in order to avoid this complicated calculation, ∠FAO can be used as the cost function. As shown in FIG. 5A and FIG. 5B, ∠CAO is fixed. If ∠FAO is greater than ∠CAO and the terminal F is in the area ACD, then a virtual voltage vector adjacent to the first vector can be selected as the second vector. If ∠FAO is less than ∠CAO and the terminal F is in the area ADO, then the zero vector can be selected as the second vector. Therefore, the vector can be selected by only comparing ∠FAO and ∠CAO. In this way, weighting factor is not required in the process of selecting two vectors.

Step 6: Calculating the duration of two vectors and synthesizing the two vectors and outputting.

Figure 6A:
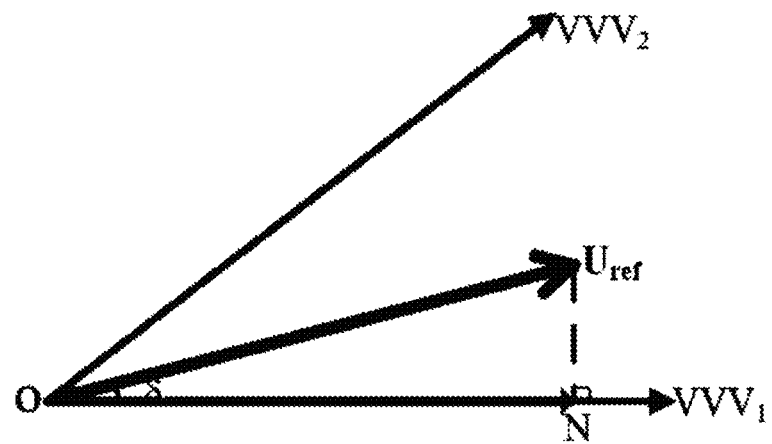
Figure 6B:
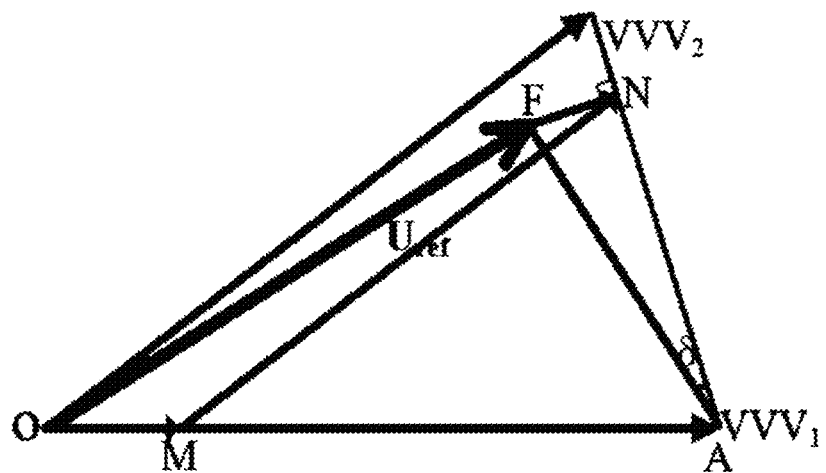

6.1: Calculation of the vector duration;

As shown in FIG. 6A, when a virtual voltage vector and a zero vector are selected, $\overrightarrow{ON}$ is the vector to be output, $|\overrightarrow{ON}|$ is the projection of $U_{ref}$ on the line where $VVV_1$ is located, and the amplitude of $VVV_1$ is 0.5527 $U_{dc}$; therefore, the following formula can be used to calculate the duration of $VVV_1$;

$$T_{opt} = \frac{|\overrightarrow{ON}|}{0.5527 U_{dc}} T_s = \frac{|U_{ref}|\cos(\delta)}{0.5527 U_{dc}} T_s$$

Wherein $T_{opt}$ represents the duration of $VVV_1$, then $(T_s - T_{opt})$ represents the duration of zero vector; $U_{dc}$ is the DC bus voltage; $T_s$ is the control period; $U_{ref}$ is the reference voltage vector; δ is the angle between $U_{ref}$ and $VVV_1$;

As shown in FIG. 6B, when two adjacent virtual voltage vectors $VVV_1$ and $VVV_2$ are selected, the following formula can be used to synthesize $\overrightarrow{ON}$:

$$\begin{cases} \overrightarrow{ON} = \overrightarrow{OM} + \overrightarrow{MN} \\ \overrightarrow{OM} = VVV_1 \frac{T_{opt1}}{T_s} \\ \overrightarrow{MN} = VVV_2 \frac{T_{opt2}}{T_s} \end{cases}$$

Wherein $T_{opt1}$ represents the duration of $VVV_1$ and $T_{opt2}$ represents the duration of $VVV_2$; δ is the angle between AF and AN;

There are the following geometric relations in FIG. 6B:

$$\begin{cases} |\overrightarrow{AN}| = |\overrightarrow{AF}|\cos(\delta) = |VVV_1 - U_{ref}|\cos(\delta) \\ |\overrightarrow{MN}| = 1.168|\overrightarrow{AN}| = |VVV_2|\frac{T_{opt2}}{T_s} \end{cases}$$

The duration of $VVV_1$ and $VVV_2$ can be obtained by shifting the phase slightly:

$$\begin{cases} T_{opt2} = \frac{1.618|U_{ref} + VVV_1|\cos(\delta)}{0.5527 U_{dc}} T_s \\ T_{opt1} = T_s - T_{opt2} \end{cases}$$

Figure 7A:
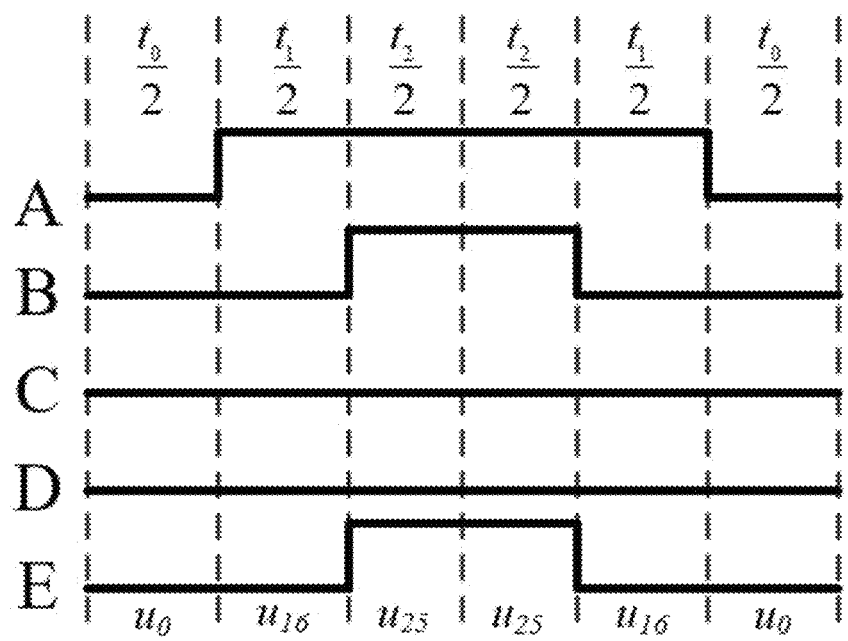
Figure 7B:
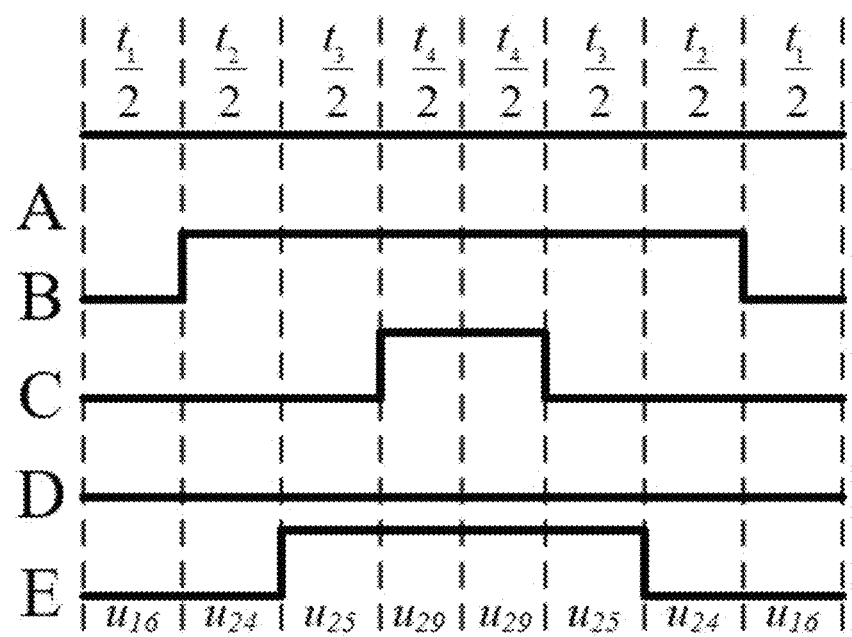

6.2) PWM generation;

The vectors selected in each sector are different, but the principle of arranging the switching sequence is the same. Assuming it is the first sector, if VVV$_1$ is selected as the first vector and zero vector is selected as the second vector, then the vector action sequence should be: U$_0$(00000)→U$_{16}$ (10000)→U$_{25}$(11001)→U$_{25}$(11001)→U$_{16}$(10000)→U$_0$ (00000), as shown in FIG. 7A; If VVV$_1$ is selected as the first vector and VVV$_2$ is selected as the second vector, the sequence of vector action should be: U$_{16}$(10000) →U$_{24}$ (11000)→U$_{25}$(11001)→U$_{29}$(11101)→U$_{29}$(11101)→U$_{25}$ (11001)→U$_{24}$(11000)→U$_{16}$(10000), as shown in FIG. 7B.

Figure 8A:
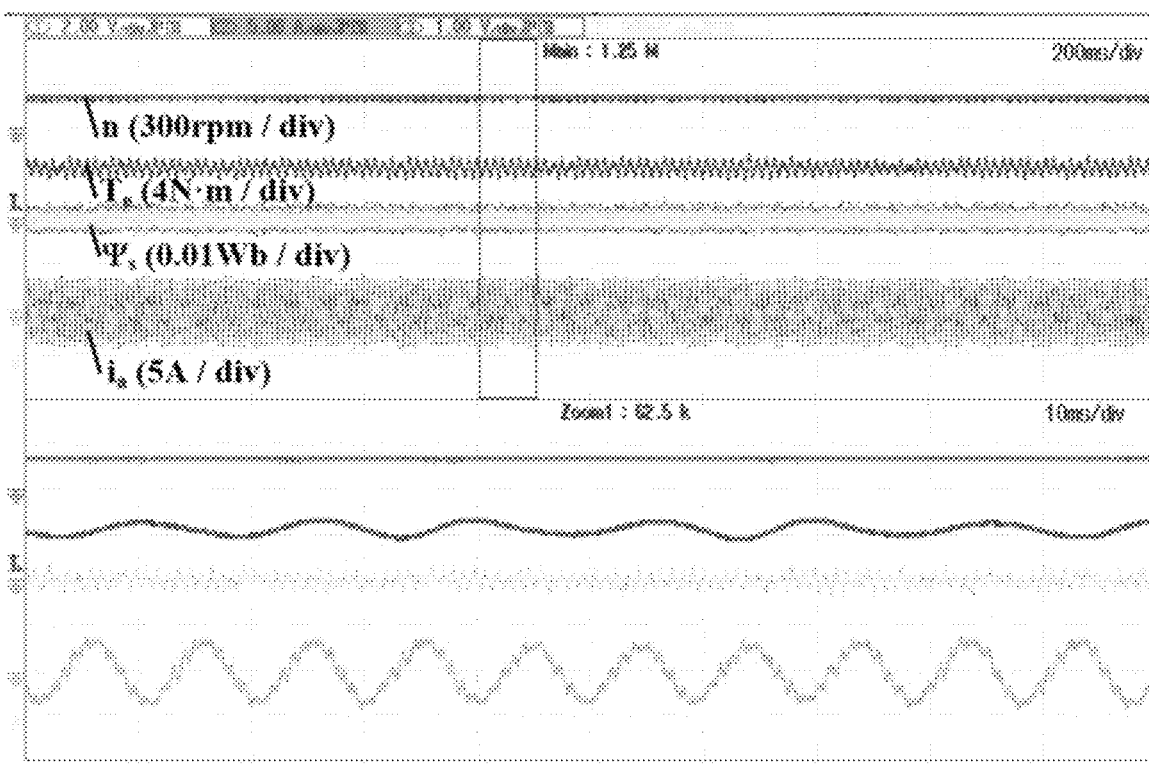
Figure 8B:
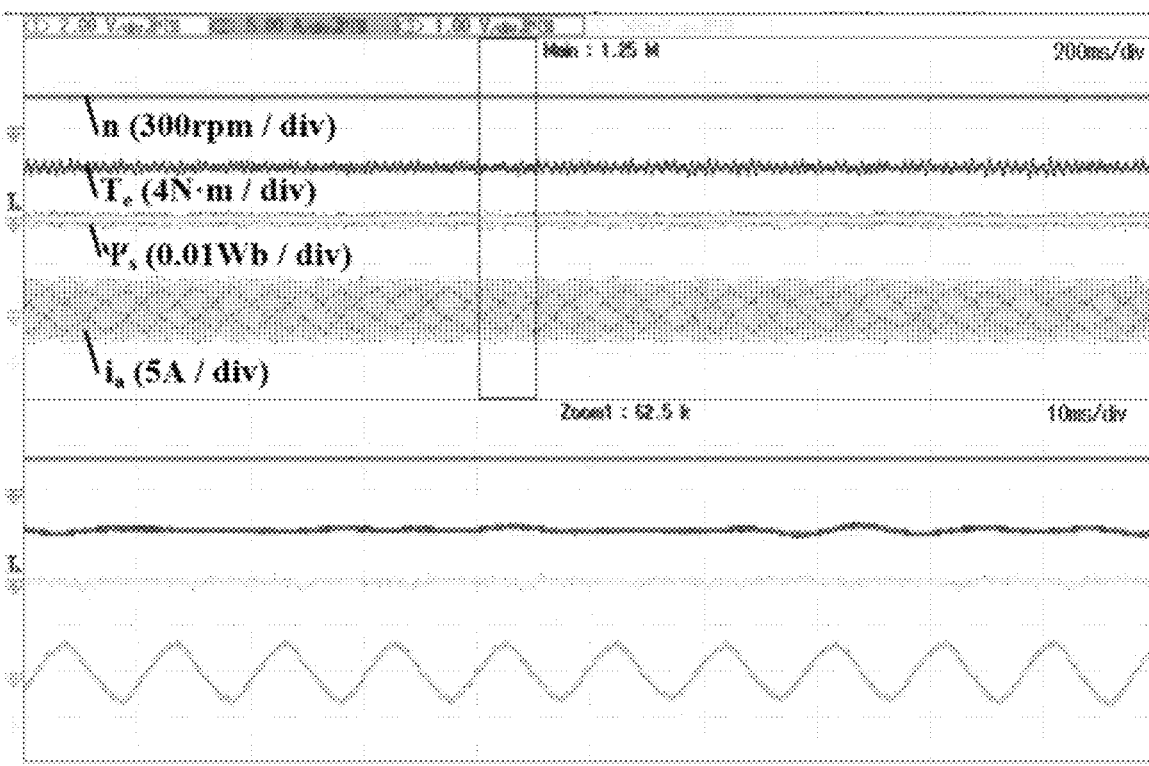

FIG. 8A and FIG. 8B present the static performance experimental comparison diagram of the control method of the present invention and the traditional model predictive control method, including speed, torque, flux linkage and current waveform. The running condition of the motor is: the speed is 200 r/min, the load is 5 N·m. It can be seen from FIG. 8A and FIG. 8B that the torque and flux ripple of the method of this invention are obviously reduced, and the current is obviously better.

Figure 9A:
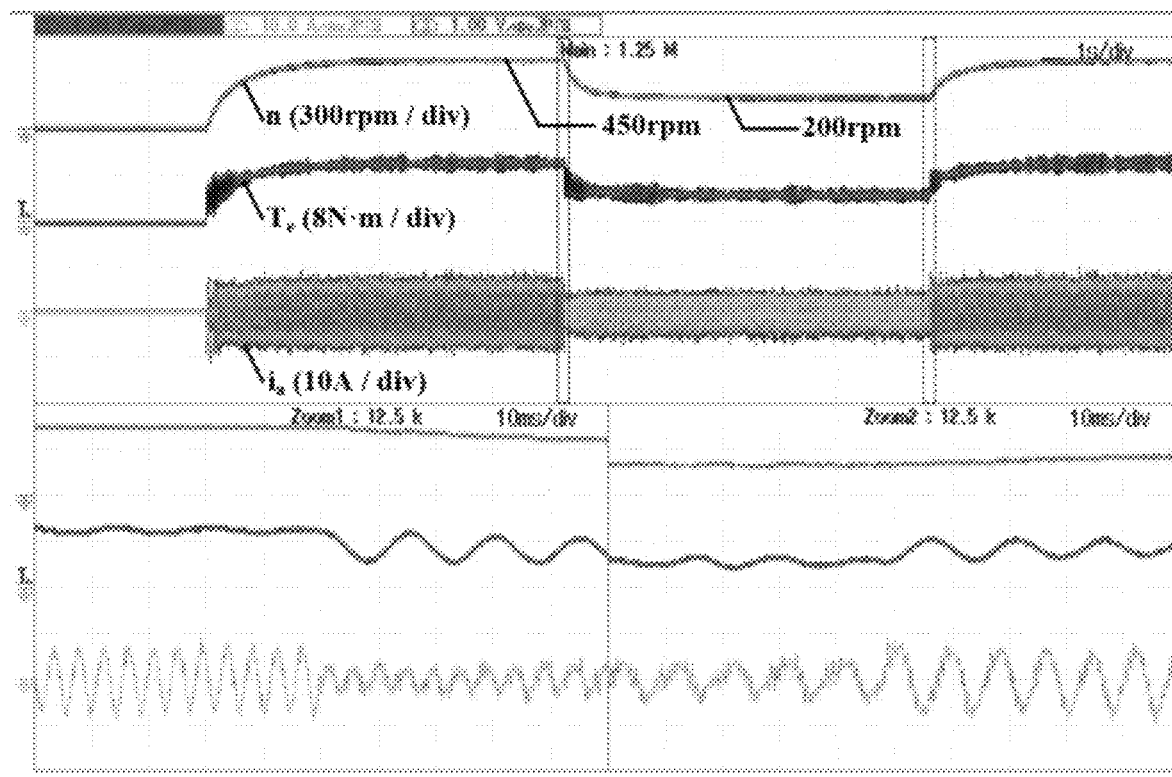
Figure 9B:
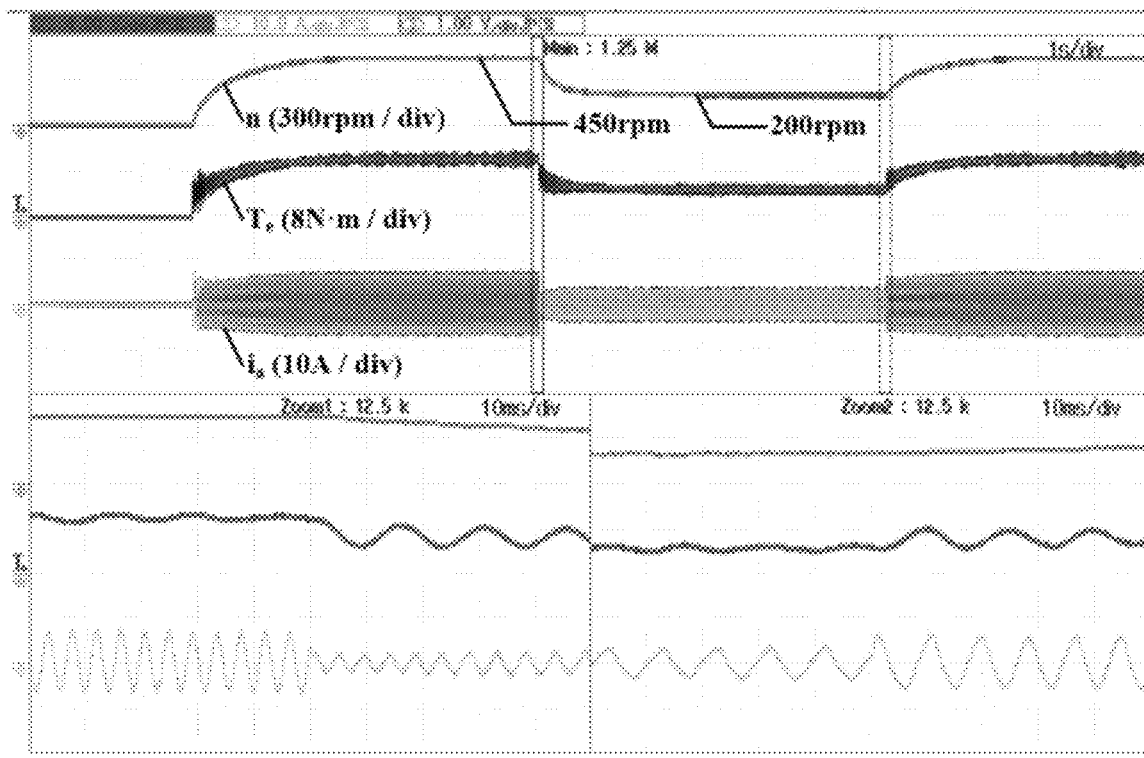

FIG. 9A and FIG. 9B present the dynamic performance experimental comparison diagram of the control method of this invention and the traditional model predictive control method, including the speed, torque and current waveforms, The motor speed increases from 0 to rated 450 r/min, then decreases from 450 r/min to 200 r/min, and finally returns to 450 r/min. It can be seen that the dynamic response speed of the two control methods is almost the same, so the control method of this invention inherits the advantages of fast dynamic response speed of traditional model predictive control while improving the static performance.

To sum up, the method implementation of the double virtual voltage vectors predictive torque control without weighting factor of five-phase motor of the present invention include obtaining the current component in two-phase stationary coordinate system and the output voltage at k interval; performing the one-step delay compensation to obtain the current component in two-phase stationary=coordinate system at k+1 interval; predicting the flux and torque at k+1 interval; the reference voltage vector needed at k+1 interval is predicted according to the principle of flux and torque deadbeat, and then the first virtual voltage vector is selected; the second virtual voltage vector is selected according to the principle of voltage error tracking, and the duration of the two vectors is calculated and synthesized. On the basis of not changing the topological structure of the original five-phase permanent magnet synchronous motor drive control system, the present invention effectively suppresses the harmonics in the five-phase motor by using the virtual voltage vector; adopts the deadbeat principle to select the vector directly and quickly, greatly reduces the calculation burden of the traditional model predictive control method; and uses the voltage error tracking principle, without considering the traditional cost function; double virtual voltage vectors are used, to improve the static performance of the motor.

The above embodiments are only used to illustrate the design ideas and characteristics of the invention, and the purpose of which is to enable those skilled in the art to understand the content of the present invention and to implement them. The scope of protection of the invention is not limited to the above embodiments. Therefore, any equivalent change or modification made according to the principle and design idea disclosed in the invention is within the protection scope of the present invention.

What is claimed is:

1. A double virtual voltage vectors predictive torque control method without a weighting factor for a five-phase permanent magnet synchronous motor, comprising the following steps:

step 1: obtaining current components i$^k_d$ and i$^k_q$ in a two-phase stationary coordinate system at a k interval and an outputting voltage component u$^k_d$ and u$^k_q$ at the k interval:

step 2: performing a one step delay compensation for step 1 to obtain the current components in the two-phase stationary coordinate system at the k interval further comprising utilizing an Euler forward discretization method to discretize a system equation of the five-phase permanent magnet synchronous motor to obtain:

$$\begin{cases} i_d^{k+1} = \left(1 - \frac{R_s T_s}{L_d}\right) i_d^k + L_q T_s \omega_q^k + \frac{T_s u_d^k}{L_q} \\ i_q^{k+1} = -T_s \omega_d^k + \left(1 - \frac{R_s T_s}{L_q}\right) i_q^k + \frac{T_s u_q^k}{L_q} - \frac{T_s \omega \psi_f}{L_g} \end{cases}$$

wherein i$_d^k$ and i$_q^k$ are the current components in the two-phase stationary coordinate system
at the k interval: i$_d^{k+1}$ and i$_q^{k+1}$ are the current components in the two-phase stationary coordinate system at the k+1 interval: u$_d^k$ and u$_q^k$ are the outputting voltage component in the two-phase stationary coordinate system at the k interval; T$_s$, is a control period; ω is an electric angular velocity of a rotor, R$_s$, is a stator resistance: L$_q$, and L$_d$ are a quadrature axis inductance and a digital axis inductance: ψ$_f$ a flux linkage of a permanent magnet: and substituting i$_d^k$, i$_q^k$, u$_d^k$ and u$_q^k$ obtained in step 1 into the above formula, to obtain the current components i$_d^{k+1}$ and i$_q^{k+1}$ in the two-phase rotating coordinate system at the k+1 interval and then completing the one step delay compensation;

step 3: predicting a flux and a torque of the five-phase permanent magnet synchronous motor at a k+1 interval according to current components i$_d^{k+1}$ and i$_q^{k+1}$ in the two-phase stationary coordinate system at the k+1 interval:

step 4: calculating a reference voltage vector needed by the five-phase permanent magnet synchronous motor and selecting a first virtual voltage vector;

step 5: selecting a second virtual voltage vector; and step 6: calculating a duration of the first virtual voltage vector and the second virtual voltage vector to thereby suppress the harmonics in the five-phase permanent magnet synchronous motor.

2. The double virtual voltage vectors predictive torque control method without the weighting factor for the five-phase permanent magnet synchronous motor according to claim 1, wherein the specific steps of step 1 comprise:

detecting a current i$_{abcde}$ in a five-phase natural coordinate system in real time, and then obtaining the current components i$_d^k$ and i$_q^k$ in the two-phase stationary coordinate system at the k interval according to a coordinate transformation from the five-phase natural coordinate system to the two-phase stationary coordinate system; at the same time, detecting a pulse at the k interval of an inverter to calculate an outputting voltage u$_s^k$ at the k interval and obtaining the outputting voltage component $u_d^k$ and $u_q^k$ in the two-phase stationary coordinate system according to the coordinate transformation.

3. The double virtual voltage vectors predictive torque control method without the weighting factor for the five-phase permanent magnet synchronous motor according to claim 1, wherein the specific steps of step 3 comprise:
substituting $i_d^{k+1}$ and $i_q^{k+1}$ into the following formula:

$$\begin{cases} T_e^{k+1} = 2.5 P_n i_q^{k+1} \psi_f \\ \psi_d^{k+1} = L_d i_d^{k+1} + \psi_f \\ \psi_q^{k+1} = L_q i_q^{k+1} \end{cases}$$

wherein $i_d^{k+1}$ and $i_q^{k+1}$ are the current components in the two-phase stationary coordinate system at the k+1 interval; $L_q$ and $L_d$ are the quadrature axis inductance and the digital axis inductance; $\psi_f$ is the flux linkage of the permanent magnet; $P_n$ is pole pairs of the five-phase permanent magnet synchronous motor; and predicting a quadrature flux linkage $\psi_d^{k+1}$ and a digital flux linkage $\psi_q^{k+1}$ at the k+1 interval and an electromagnetic torque $T_e^{k+1}$ at the k+1 interval.

4. The double virtual voltage vectors predictive torque control method without the weighting factor for the five-phase permanent magnet synchronous motor according to claim 1, wherein the specific steps of step 4 comprise:

4.1: predicting the reference voltage vector needed by the five-phase permanent magnet synchronous motor at the k+1 interval;

utilizing the Euler forward discretization method to discretize the system equation to obtain a quadrature axis flux linkage $\psi_d^{k+2}$ and a digital axis flux linkage $\psi_q^{k+2}$ at a k+2 interval:

$$\begin{cases} \psi_d^{k+2} = \psi_d^{k+1} + u_d^{k+1} T_s + \omega T_s \psi_q^{k+1} - \frac{R_s T_s}{L_d}(\psi_d^{k+1} - \psi_f) \\ \psi_q^{k+2} = \psi_q^{k+1} + u_q^{k+1} T_s + \omega T_s \psi_d^{k+1} - \frac{R_s T_s}{L_q} \psi_q^{k+1} \end{cases}$$

wherein $u_d^{k+1}$ and $u_q^{k+1}$ are a voltage component in the two-phase stationary coordinate system at the k+1 interval; and $\psi_d^{k+1}$ and $\psi_q^{k+1}$ are a quadrature flux linkage and a digital flux linkage at the k+1 interval; $T_s$ is a control period; $\omega$ is an electric angular velocity of a rotor; $R_s$ is a stator resistance; $L_q$ and $L_d$ are a quadrature axis inductance and a digital axis inductance; $\psi_f$ is a flux linkage of a permanent magnet; an expression of an electromagnetic torque is:

$$T_e = \frac{5}{2} p_n \psi_f \frac{\psi_q}{L_q}$$

wherein $T_e$ is the electromagnetic torque; $\psi_q$ is a quadrature axis flux linkage; $P_n$ is pole pairs of the five-phase permanent magnet synchronous motor;

then, a time derivative of two sides of the expression of the electromagnetic torque is written as follows:

$$T_e^{k+2} - T_e^{k+1} = \frac{5}{2} p_n \psi_f \frac{(\psi_q^{k+2} - \psi_q^{k+1})}{L_q}$$

wherein $T_e^{k+1}$ is the electromagnetic torque at the k+1 interval; $T_e^{k+2}$ is the electromagnetic torque at the k+2 interval; $\psi_q^{k+2}$ is the quadrature axis flux linkage at the k+2 interval;

substituting an expression of $\psi_q^{k+2}$ into the above formula to obtain:

$$T_e^{k+2} - T_e^{k+1} = \frac{5}{2} \frac{p_n \psi_f}{L_q} \left( u_q^{k+1} T_s - \omega T_s \psi_d^{k+1} - \frac{R_s T_s}{L_q} \psi_q^{k+1} \right)$$

an expression of $u_q^{k+1}$ is obtained by phase shifting the above formula:

$$\begin{cases} u_q^{k+1} = \frac{2 L_d (T_e^{k+2} - T_e^{k+1})}{5 P_n \psi_f T_s} + \omega \psi_d^{k+1} + \frac{R_s \psi_q^{k+1}}{L_d} \end{cases}$$

because a voltage drop of a resistance is far less than a stator voltage, a resistance term in the expression of $\psi_q^{k+2}$ and an expression of $\psi_d^{k+2}$ is ignored to derive the following formula:

$$(\psi^{k+2})^2 = (\psi_d^{k+2})^2 + (\psi_q^{k+2})^2$$
$$= (\psi_d^{k+1} + u_d^{k+1} T_s + \omega T_s \psi_q^{k+1})^2 + (\psi_q^{k+1} + u_q^{k+1} T_s - \omega T_s \psi_d^{k+1})^2$$

substituting the expression of $u_q^{k+1}$ into the above expression, to obtain an expression of $u_d^{k+1}$:

$$u_d^{k+1} = \frac{\sqrt{(\psi^{k+2})^2 - (u_q^{k+1} T_s + \psi_q^{k+1} - \omega T_s \psi_d^{k+1})^2}}{T_s} - \omega \psi_q^{k+1} - \frac{\psi_d^{k+1}}{T_s}$$

according to the deadbeat principle of the torque and the flux, the torque and the flux at the k+2 interval are expected to reach a given value, therefore:

$$\begin{cases} T_e^{k+2} = T_e^* \\ \psi^{k+2} = \psi_f \end{cases}$$

wherein $T_e^*$ is a given electromagnetic torque; therefore, an expression of an expected reference voltage is:

$$\begin{cases} u_q^{k+1} = \frac{2 L_d (T_e^* - T_e^{k+1})}{5 P_n \psi_f T_s} + \omega \psi_d^{k+1} + \frac{R_s \psi_q^{k+1}}{L_d} \\ u_d^{k+1} = \frac{\sqrt{(\psi_f)^2 - (u_q^{k+1} T_s + \psi_q^{k+1} - \omega T_s \psi_d^{k+1})^2}}{T_s} - \omega \psi_q^{k+1} - \frac{\psi_d^{k+1}}{T_s} \end{cases}$$

after the coordinate transformation, a reference voltage component in the two-phase stationary coordinate system is obtained:

$$u_{ref} = \begin{pmatrix} u_\alpha^{k+1} \\ u_\beta^{k+1} \end{pmatrix} = \begin{pmatrix} \cos\theta & -\sin\theta \\ \sin\theta & \cos\theta \end{pmatrix} \begin{pmatrix} u_d^{k+1} \\ u_q^{k+1} \end{pmatrix}$$

wherein θ is a rotor position angle; $u_{ref}$ is the expected reference voltage;

4.2: synthesis of virtual voltage vectors;

a five phase voltage source inverter provides 32 kinds of switch combinations, and each switch combination of the 32 kinds of switch combinations corresponds to a space voltage vector; therefore, the five phase voltage source inverter outputs 32 space voltage vectors $U_0$-$U_{31}$, comprising 30 active vectors $U_1$-$U_{30}$ and 2 zero vectors $U_0$ and $U_{31}$; the active vectors are divided into large vectors, medium vectors and small vectors according to amplitudes of the active vectors;

in an α-β plane, a vector distribution is as follows:

the large vectors are: $U_3$, $U_6$, $U_7$, $U_{12}$, $U_{14}$, $U_{17}$, $U_{19}$, $U_{24}$, $U_{25}$, $U_{28}$;

the medium vectors are: $U_1$, $U_2$, $U_4$, $U_{18}$, $U_{15}$, $U_{16}$, $U_{23}$, $U_7$, $U_{29}$, $U_{30}$;

the small vectors are: $U_5$, $U_9$, $U_{10}$, $U_{11}$, $U_{13}$, $U_{18}$, $U_{20}$, $U_{21}$, $U_{22}$, $U_{26}$;

in an x-y plane, the vector distribution is as follows:

the large vectors are: $U_5$, $U_9$, $U_{10}$, $U_{11}$, $U_{13}$, $U_{18}$, $U_{20}$, $U_{21}$, $U_{22}$, $U_{26}$;

the medium vectors are: $U_1$, $U_2$, $U_4$, $U_{18}$, $U_{15}$, $U_{16}$, $U_{23}$, $U_7$, $U_{29}$, $U_{30}$;

the small vectors are: $U_3$, $U_6$, $U_7$, $U_{12}$, $U_{14}$, $U_{17}$, $U_{19}$, $U_{24}$, $U_{25}$, $U_{28}$;

in the α-β plane, the large vectors and the medium vectors in the same an identical direction are projected onto the x-y plane, as small vectors and medium vectors in an opposite direction; therefore, a harmonic voltage in the x-y plane is completely eliminated by synthesizing the large vectors and the medium vectors in the identical direction in a certain proportion; the virtual voltage vectors are synthesized by the following formula:

$$VVV_i(u_M, u_L) = 0.382 \times u_M \times 0.618 \times u_L$$

wherein $u_M$ is the medium vector, $u_L$ is the large vector, $VVV_i$ is the virtual voltage vector;

a number of synthesized virtual voltage vectors is 10, the synthesized virtual voltage vectors are $VVV_{1-10}$, and an amplitude of the synthesized virtual voltage vectors is 0.5527 $U_{dc}$, wherein $U_{dc}$ is a DC bus voltage;

4.: selecting the first virtual voltage vector;

according to an expression of the reference voltage vector $U_{ref}$ in the two-phase stationary coordinate system having a first sector, wherein $U_{ref}$ is located in the first sector and $D_1$, $D_2$ and $D_{10}$ represent an error between $U_{ref}$ and $VVV_1$, $VVV_2$ and $VVV_{10}$ respectively; wherein $D_1$ is smaller than $D_2$ and $D_{10}$.

5. The double virtual voltage vectors predictive torque control method without the weighting factor for the five-phase permanent magnet synchronous motor according to claim 1, wherein the specific steps of step 5 comprise:

5.1: selection of the second virtual voltage vector;

a point O is an origin of coordinates, a point A is an end point of $VVV_1$, a point C an end point of an angular bisector of ∠OAD, a point D is an intersection of a division line of the first sector and a sector boundary, a point F is an end point of the reference voltage vector $U_{ref}$, and points M and N are closest points from two edges of ∠OAD to the point F respectively;

assuming $U_{ref}$ is located in the first sector, AC is the angular bisector of ∠OAD, and a distance from any point on the angular bisector to both sides of ∠OAD is equal; therefore, AC is divided an area ADO and an area ACD;

when the end point F of $U_{ref}$ is located in the area ADO, FM is smaller than FN and FA, and an error between $\overrightarrow{OM}$ and $U_{ref}$ is the smallest; therefore, a zero vector is selected as the second vector to synthesize and output $\overrightarrow{OM}$ with the first virtual voltage vector $VVV_1$;

when the end point F of $U_{ref}$ is located in ACD, FN is less than FM and FA, and an error between $\overrightarrow{ON}$ and $U_{ref}$ is the smallest; therefore, $VVV_2$ is selected as the second vector to synthesize and output $\overrightarrow{ON}$ with the first virtual voltage vector $VVV_1$;

in the same way, when $U_{ref}$ is located at a position of $U_{ref1}$, the second vector is selected between the zero vector and $VVV_{10}$, the second vector is the zero vector or a virtual voltage vector adjacent to the first virtual voltage vector;

5.2: optimization of a cost function;

to avoid a complicated calculation, ∠FAO is used as the cost function, ∠CAO is fixed, if ∠FAO is greater than ∠CAO and the end point F is in the area ACD, then the virtual voltage vector adjacent to the first virtual voltage vector is selected as the second virtual voltage vector;

if ∠FAO is less than ∠CAO and the end point F is in the area ADO, then the zero vector is selected as the second vector;

therefore, the second virtual voltage vector is selected by only comparing ∠FAO and ∠CAO; and the weighting factor is not required in a process of selecting the first virtual voltage vector and the second virtual voltage vector.

6. The double virtual voltage vectors predictive torque control method without the weighting factor for the five-phase permanent magnet synchronous motor according to claim 1, wherein the specific steps of step 6 comprise:

6.1: calculating the duration of the first virtual voltage vector and the second virtual voltage vector; wherein when a virtual voltage vector and a zero vector are selected, $\overrightarrow{ON}$ is a vector to be output, $\overrightarrow{ON}$ is a projection of $U_{ref}$ on a line, wherein $VVV_1$ is located in the line, and an amplitude of $VVV_1$ is 0.5527 $U_{dc}$;

therefore, a duration of $VVV_1$ is calculated by the following formula:

$$T_{opt} = \frac{|\overrightarrow{ON}|}{0.5527 U_{dc}} T_s = \frac{|U_{ref}|\cos(\delta)}{0.5527 U_{dc}} T_s$$

wherein $T_{opt}$ represents the duration of $VVV_1$, then ($T_s$-$T_{opt}$) represents a duration of the zero vector; $U_{dc}$ is a DC bus voltage; $T_s$ is a control period; $U_{ref}$ is the reference voltage vector; δ is an angle between $U_{ref}$ and $VVV_1$;

when two adjacent virtual voltage vectors $VVV_1$ and $VVV_2$ are selected, $\overrightarrow{ON}$ is synthesized by the following formula:

$$\begin{cases} \overrightarrow{ON} = \overrightarrow{OM} + \overrightarrow{MN} \\ \overrightarrow{OM} = VVV_1 \dfrac{T_{opt1}}{T_s} \\ \overrightarrow{MN} = VVV_2 \dfrac{T_{opt2}}{T_s} \end{cases}$$

wherein $T_{opt1}$ represents the duration of $VVV_1$ and $T_{opt2}$ represents a duration of $VVV_2$; is an angle between $\overrightarrow{AF}$ and AN;
there are the following geometric relations:

$$\begin{cases} |\overrightarrow{AN}| = |\overrightarrow{AF}|\cos(\delta) = |VVV_1 - U_{ref}|\cos(\delta) \\ |\overrightarrow{MN}| = 1.618|\overrightarrow{AN}| = |VVV_2|\dfrac{T_{opt2}}{T_s} \end{cases}$$

the duration of $VVV_1$ and the duration of $VVV_2$ are obtained by shifting a phase slightly:

$$\begin{cases} T_{opt2} = \dfrac{1.618|\overrightarrow{U_{ref}} - VVV_1|\cos(\delta)}{0.5527 U_{dc}} T_s \\ T_{opt1} = T_s - T_{opt2} \end{cases}$$

6.2: pulse width modulation (PWM) generation; vectors selected in each sector are different, and a principle of arranging a switching sequence is the same;
for a first sector, if $VVV_1$ is selected as the first virtual voltage vector and the zero vector is selected as the second virtual voltage vector, then a first vector action sequence is: $U_0(00000) \rightarrow U_{16}(10000) \rightarrow U_{25}(11001) \rightarrow U_{25}(11001) \rightarrow U_{16}(10000) U_0(90000)$; and
if $VVV_1$ is selected as the first virtual voltage vector and $VVV_2$ is selected as the second virtual voltage vector, a second vector action sequence is: $U_{16}(10000) \rightarrow U_{24}(11000) \rightarrow U_{25}(11001) \rightarrow U_{29}(11101) \rightarrow U_{29}(11100) \rightarrow U_{25}(11001) \rightarrow U_{24}(11000) \rightarrow U_{16}(10000)$.

\* \* \* \* \*